April 13, 1965 A. E. BACHELET ETAL 3,178,643

PULSE TRANSMISSION ECHO SUPPRESSION SYSTEM

Filed Nov. 21, 1960 4 Sheets-Sheet 1

INVENTORS A.E. BACHELET
J.S. BOMBA
BY E J [signature]
ATTORNEY

PULSE TRANSMISSION ECHO SUPPRESSION SYSTEM

Filed Nov. 21, 1960 4 Sheets-Sheet 2

INVENTORS A. E. BACHELET
J. S. BOMBA
BY E. J. Kreider
ATTORNEY

INVENTORS A. E. BACHELET
J. S. BOMBA
BY E. J. Olinder
ATTORNEY

INVENTORS A. E. BACHELET
J. S. BOMBA
BY E. J. Snider
ATTORNEY

3,178,643
PULSE TRANSMISSION ECHO SUPPRESSION SYSTEM

Albert E. Bachelet, New York, N.Y., and James S. Bomba, Millburn, N.J., assignors to Bell Telephone Laboratories, Incorporated, New York, N.Y., a corporation of New York Filed Nov. 21, 1960, Ser. No. 70,482
10 Claims. (Cl. 325—42)

This invention relates to pulse communication systems and its principal object is to reduce interference caused by echoes and noise in such systems.

In designing a transmission facility specifically for pulse communication, the problem of interference by echoes may be avoided or substantially diminished by the application of well known techniques to establish advantageous relations between the various design parameters which may include, for example, bandwidth, pulse repetition rate, type of coding and the characteristics of the line and terminal equipment. With the current increase in pulse communication, however, the economic need for maximum employment of existing equipment often requires pulse transmission over facilities designed for other forms of communication, such as voice for example. Line transmission characteristics that may be suitable for voice communication are seldom ideal for pulse channels and consequently, pulse transmission quality is frequently impaired by the presence of echoes. Moreover, conventional equipment such as echo suppressors, frequently employed to limit echo interference in voice systems, require relatively complex circuitry which cannot readily be adapted to reduce echo interference in pulse systems.

Accordingly, a specific object of the invention is to avoid interference by echoes in pulse transmission systems without resort to complex circuitry. A further object is to maintain high transmission quality in pulse systems employing circuit facilities designed for other forms of communication.

These and other objects are attained in accordance with the principles of the invention by the employment of two or more distinct frequency compositions or "modes" for the transmission of pulse coded messages. Each mode may consist of a single respective frequency or, alternatively of a respective combination of frequencies. Further, in accordance with the invention, the transmitter is designed to shift modes after the transmission of each character, a character being used herein to denote an information bit, a number, a letter, or other similar quantum of intelligence.

An important aspect of the invention is the synchronization of the receiver to the modes of the transmitter. A receiver in accordance with the invention includes means responsive after a preassigned time delay to the termination of each character for disabling the receiver for a period which corresponds to the time space between characters. Additionally, means operative after the termination of the disabling period are provided to shift the receiver to the preassigned mode or frequency band of the next succeeding character. During a sequence of characters, the receiver shifts modes sequentially in response to the mode of the transmitted signal and accordingly, no signal other than the signals representing the transmitted intelligence are required to synchronize the mode of the receiver to the mode of the transmitter.

In accordance with a further principle of the invention the pulse or character repetition rate employed is advantageously related to the time lapse between the receipt of a character and the receipt of the first or maximum amplitude echo of that character. As a result, substantially all echoes of interference potential arrive at the receiver either when the receiver is disabled or after the receiver has been switched to a mode other than the mode of the received echo. In short, the receiver is made insensitive to signal echoes and echo interference is thereby avoided.

Accordingly, one feature of the invention is a system of pulse transmission employing a plurality of frequency modes, the mode of each character differing from the mode of the preceding character.

Another feature of the invention is a means for avoiding echo interference in a pulse transmission system which includes means for shifting both the transmiter and the receiver in a preassigned sequential pattern of frequency modes at a rate uniquely related to the time lapse between the receipt of a signal and its corresponding echo.

A further feature of the invention is a means for synchronizing a pulse transmitter and a pulse receiver to a preselected, sequential pattern of frequency modes without resort to synchronizing signals.

The principles of the invention and additional objects and features thereof will be fully apprehended from the following detailed description of an illustrative embodiment, and from the appended drawings in which.

Echoes in transmission systems generally result from a combination of conditions such as impedance mismatches and low return loss. Such conditions may be present, for example, in telephone systems which include both four wire and two wire links. Moreover, the echo problem is generally increased when the transmission line characteristics are not specifically designed for the type of transmission being employed. This situation may exist, for example, when pulse transmission is employed over telephone networks.

Figure 6:
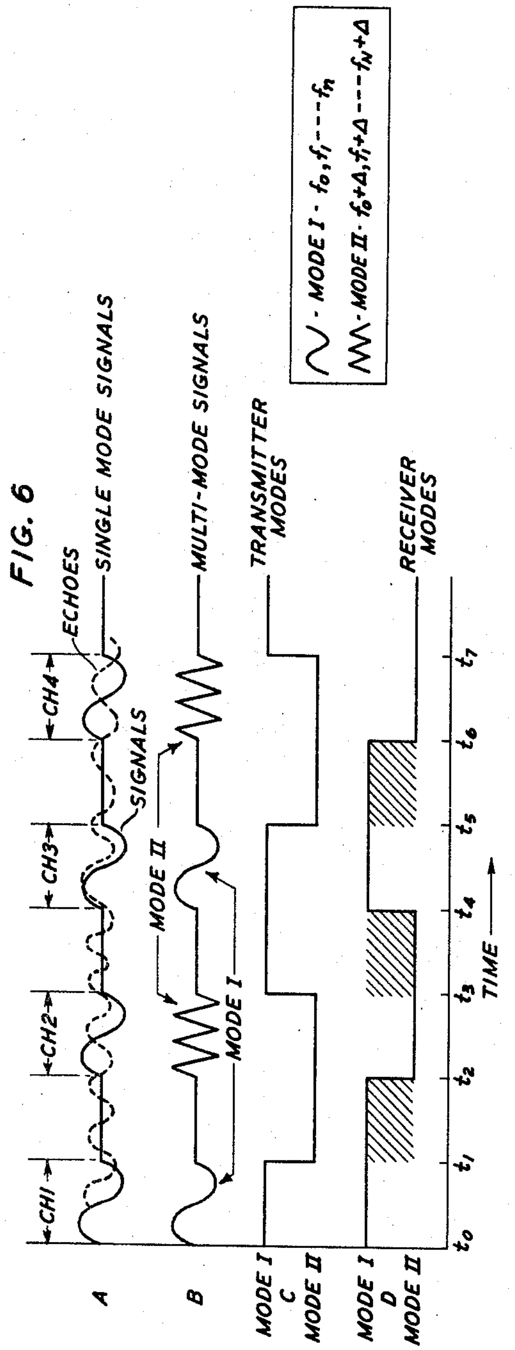
FIGS. 6, 7, and 8 are time plots illustrating various aspects of the mode synchronism between the transmitter shown in FIG. 1 and the receiver shown in FIG. 4.

The specific echo problem solved by a communication system embodying the principles of the invention is illustrated by the single mode signals and echoes of plot A in FIG. 6. A succession of characters CH1 through CH4 are shown, each being transmitted in a respective one of the time slots $t_0$–$t_1$, $t_2$–$t_3$, $t_4$–$t_5$, $t_6$–$t_7$. Each character is represented by a sinusoidal waveform to indicate a common frequency composition or a single transmission mode. Although a transmission mode, as employed herein, denotes a single or common frequency composition for each character, it may include any one of a variety of particular coding forms. For example, each character or information bit may be represented by a particular order of two or more tone pulses, a particular time position for a single tone pulse, a single tone pulse characterized by a distinctive combination of frequencies or a series of single tone pulses and spaces.

In a system employing a single transmission mode for every character, the receiver is necessarily operated in the same mode as the transmitter which is to say that during the receipt of any character after the initial character, the receiver is unable to distinguish any particular character from echoes of preceding characters. Echo interference of this type is illustrated by the dotted sinusoidal waveform in plot A of FIG. 6.

In accordance with the invention two or more transmission modes are employed in a pulse system so that the frequency composition of each character is unlike the frequency composition of the preceding character. Thus in plot B of FIG. 6 the sinusoidal waveform representing the first character in a sequence, transmitted in the time slot $t_0$–$t_1$, may include one or more frequencies from the group $f_0$, $f_1$ . . . $f_n$. As indicated, the principles of the invention are not dependent on any particular coding scheme and hence the first character may include, for example, a particular combination of interleaved frequencies from the assigned frequency group or a single tone pulse occupying a preassigned portion of the indicated time slot. Upon the termination of the transmission of the first character CH1 at time $t_1$, the transmitter shifts to a second mode, mode II, as indicated by plot C of FIG. 6. Following an intercharacter space period $t_1$–$t_2$, the second character CH2 is transmitted in mode II, indicated by a sawtooth wave, which employs frequencies from a group such as $f_0+\Delta$, $f_1+\Delta$ . . . $f_n+\Delta$.

The principles of the invention in effect provide dual protection against interference by echoes. As indicated by plot D of FIG. 6, upon the termination of the receipt of the first character CH1, the receiver is disabled for the duration of the interval $t_1$–$t_2$, shown by the hatched area, and at $t_2$ the receiver shifts to mode II, which is to say that the receiver is receptive to frequencies from the group $f_0+\Delta$, $f_1+\Delta$ . . . $f_n+\Delta$, and insensitive to frequencies from the group $f_0$, $f_1$ . . . $f_n$. At the termination of the second character CH2, the transmitter shifts back to mode I, and the receiver, through a synchronizing arrangement, is disabled until the inception of the next character CH3 at time $t_4$. As indicated, this sequence of operations is repeated in the same fashion for succeeding characters.

In implementing the principles of the invention, allowance must necessarily be made for the lapse in time between the receipt of a signal and its corresponding echo. This time lapse of course depends on the characteristics of the particular transmission facilities being employed. Ideally, the time interval between transmission in one mode and transmission in a different mode is made substantially equal to the lapse in time between the arrival of a signal at the receiver and the arrival of its echo. The consequence of employing such a time relation is a very high degree of protection against echo interference. In the example shown in FIG. 6, the only echo interference possible is that an echo from the first character CH1 may conceivably interfere with the reception of the third character CH3 because of the common mode employed. The likelihood of such interference is extremely remote, however, in view of the relatively long interval of time and the correspondingly high degree of attenuation to which echoes are subjected.

Although the employment of only two transmission modes is illustrated in FIG. 6, it is evident that a system employing additional modes is also within the scope of the principles of the invention and will be equally effective so long as the time interval between the successive use of like modes is properly related to the time interval between the receipt of a signal and the receipt of its strongest echo.

Figures 1, 2, 3:
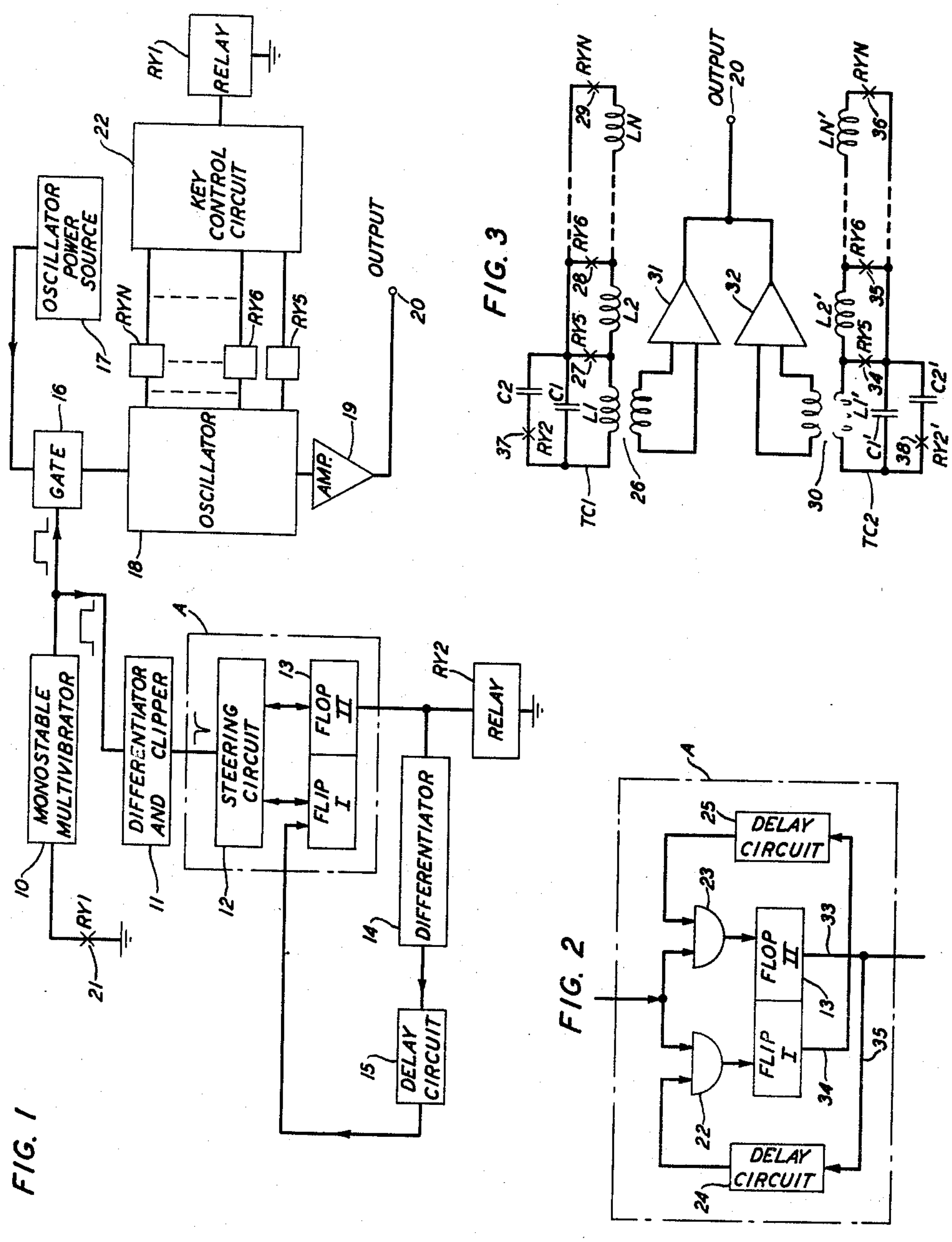
FIG. 1 is a block diagram of a transmitter in accordance with the invention.
FIG. 2 is a block diagram of the logic circuitry employed in the steering circuit shown in FIG. 1.
FIG. 3 is a schematic circuit diagram of a part of the oscillator shown in block form in FIG. 1.

A block diagram of a transmitter embodying the principles of the invention is shown in FIG. 1. The receiver includes an oscillator 18 and a key control circuit 22 together with associated relays for selecting the particular frequency combinations employed to represent the characters of a message. The remaining units of the system include a gate 16 for controlling the application of power from the source 17 to the oscillator 18 in accordance with a preassigned time sequence. The monostable multivibrator 10 is employed to control the gate 16 and also to initiate the operation of the mode control circuit which includes differentiators 11 and 14, steering circuit 12, a bistable multivibrator designated flip-flop 13, delay circuit 15 and relay RY2.

The operation of the transmitter may be initiated by some type of sender apparatus fed, for example, by a punched tape input. For simplicity of illustration, however, the sender function is provided by a key control circuit 22 which may be a pushbutton multifrequency keying circuit similar to that employed on pushbutton telephone subsets. The depression of each character key, not shown, operates a respective one of the relays RY5, RY6 . . . RYN which in turn aligns the oscillator, in a manner described in detail below in connection with the discussion of FIG. 3, to provide for the generation of a tone pulse comprising a respective pair of interleaved frequencies. Operation of the key control circuit 22 also operates relay RY1, closing make contact 21. Ground is applied through contact 21 to the monostable multivibrator 10 triggering it into operation. The output from multivibrator 10 closes gate 16, applying power to oscillator 18. The output from oscillator 18 is a tone pulse which includes a pair of frequencies from the mode I group $f_0$, $f_1$ . . . $f_n$ as preset by the key control circuit 22.

The timed output pulse from the multivibrator 10 is also applied to a differentiator and clipper 11. This unit operates in conventional fashion to produce a sharp negative pulse from the trailing edge of the positive output pulse of multivibrator 10, as shown. The steering circuit 12 applies the negative pulse to flip-flop 13. The details of the function and structure of steering circuit 12 are discussed below in connection with the description of FIG. 2. Assuming flip-flop 13 to be in the set or I condition, steering circuit 12 applies the output from differentiator 11 to shift flip-flop 13 to the reset or II condition and the resulting output is applied to operate relay RY2.

The function of relay RY2 may best be described by reference to FIG. 3, a schematic circuit diagram of a pair of tank circuits TC1 and TC2 from oscillator 18. Each of the tank circuits TC1 and TC2 includes a respective one of the capacitors C1 and C1′, and a respective one of the tapped inductors L1–L2–LN and L1′–L2′–LN′. As indicated, operation of contacts 27 and 34, 28 and 35, or 29 and 36 by relays RY5, RY6 or RYN, respectively, determines the pair of frequencies from the group $f_0$, $f_1$ . . . $f_n$ that is employed to represent a character in mode I. The operation of the mode-shifting relay RY2 closes make contacts 37 and 38 thereby adding a respective one of the mode II capacitors C2 and C2′ into each tank circuit. The consequent change in the base resonant frequency of each tank shifts the oscillator into mode II in which only frequencies from the group $f_0+\Delta$, $f_1+\Delta$ . . . $f_n+\Delta$ may be generated. In either mode of operation energy from each of the tank circuits TC1 and TC2 is applied to a respective one of the output amplifiers 31 and 32 by a respective one of the coupling coils 26 and 30 and the outputs of the amplifiers 31 and 32 are in turn applied as a combined signal to output point 20.

Figure 7:
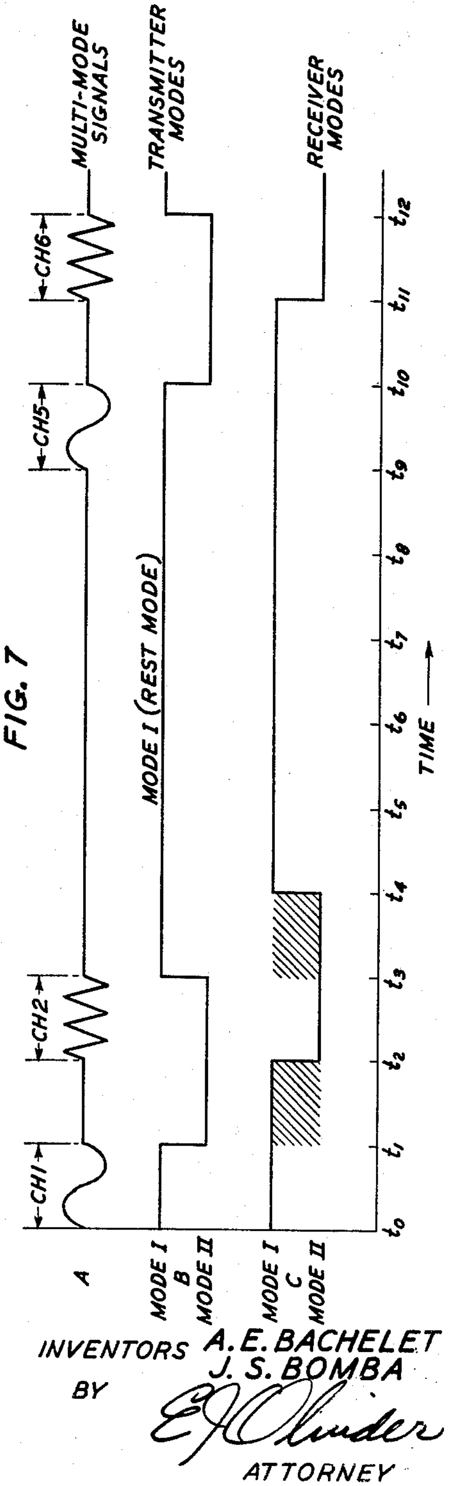

At the termination of a series of characters it is desirable to select one of the transmission modes as a common rest mode so that upon the resumption of transmission both transmitter and receiver will be operating in a common mode. For illustrative purposes, mode I has been selected as a rest mode. The termination of a two-character group is shown in FIG. 7 at time $t_3$. At this point the transmitter shifts from mode II to mode I and remains in that condition until the termination of the transmission of the initial character $CH_5$ in the second group at time $t_{10}$.

The implementation of this feature of the invention is shown in FIG. 2 which is a more detailed presentation of the units shown within the broken line box A of FIG. 1. Time $t_3$ marks the termination of the transmission of character CH2. The trailing edge of the output pulse from the multivibrator 10 is differentiated and applied as a short negative pulse to the steering circuit 12 (FIG. 1), which includes a pair of AND gates 22 and 23 (FIG. 2). At this point flip-flop 13 is in state II, corresponding to mode II, and consequently an output signal is on leads 33 and 35. This signal has already been applied by way of delay circuit 24 as an input to AND gate 22. The combination of inputs to AND gate 22 results in an AND gate output which shifts flip-flop 13 into state I. The resulting output on lead 34 is delayed sufficiently by the delay circuit 25 to preclude a coincidence of inputs to AND gate 23 and, accordingly, flip-flop 13 remains in state I and the transmitter remains in mode I until the termination of the initial character CH5 of the succeeding group at time $t_{10}$.

Figure 8:
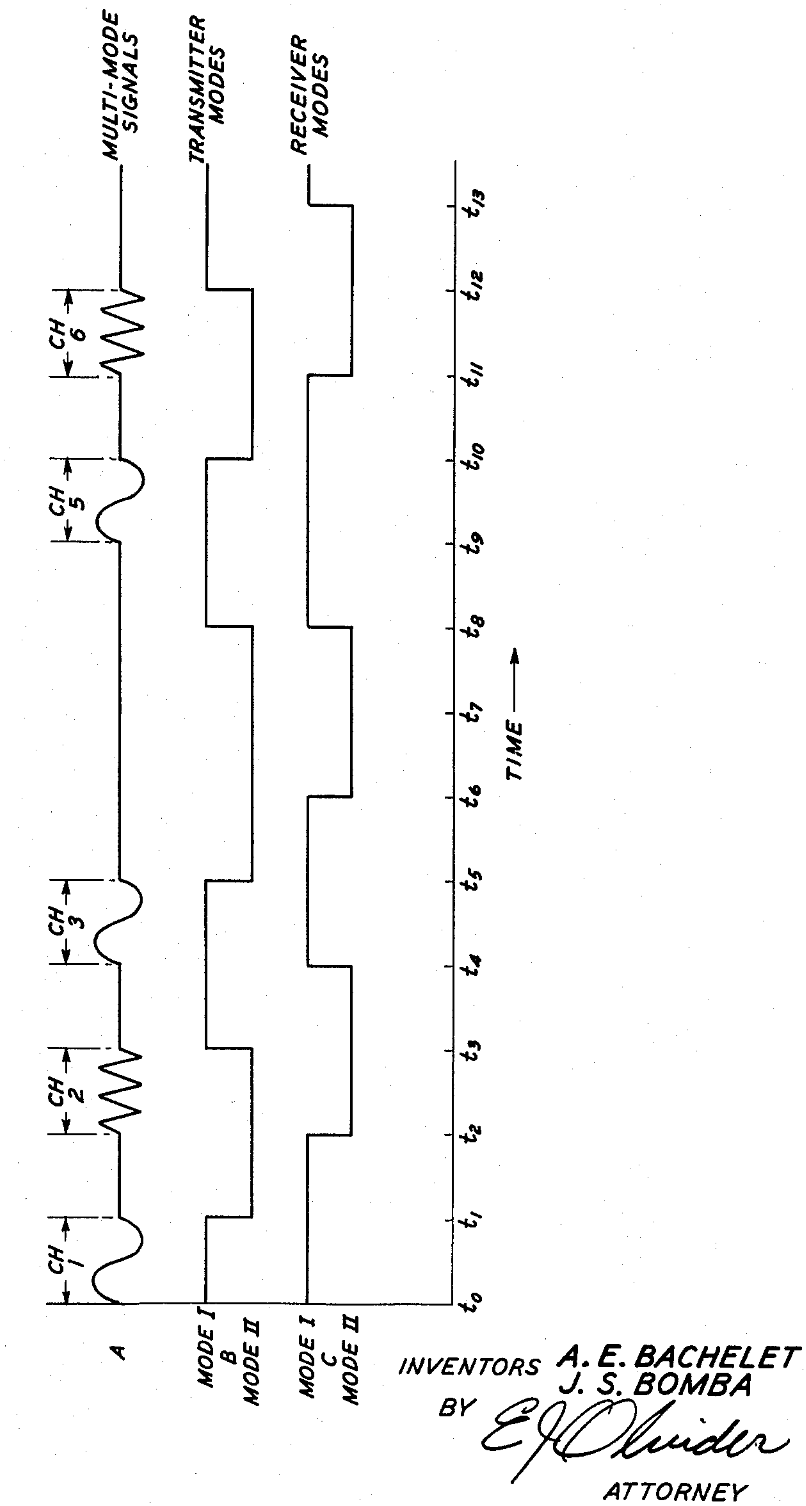

The situation obtaining when the transmitter is in mode II at the termination of a group of characters is illustrated in FIG. 8. As shown, after a delay represented by the duration of the period $t_5$–$t_8$, the transmitter is shifted back to mode I, the rest mode, in anticipation of the initial mode I character of the second group. The shift to mode II at time $t_5$ results in an output from flip-flop 13 on lead 33 (FIG. 2). Because of the delay introduced by delay circuit 24, however, there is no coincidence of inputs to AND gate 22 and the system remains in mode II. In FIG. 1 it is shown that an output from the state II operation of flip-flop 13 is applied to differentiator 14 and the resulting output is in turn applied back to flip-flop 13 by way of delay circuit 15 to change the condition of flip-flop 13 back to state I, or mode I. The delay introduced by delay circuit 15 is sufficiently long, specifically of duration $t_5$–$t_8$, to ensure that the absence of transmission does indeed represent a prolonged break between two groups of characters, rather than an extended intercharacter space.

Figures 4, 5:
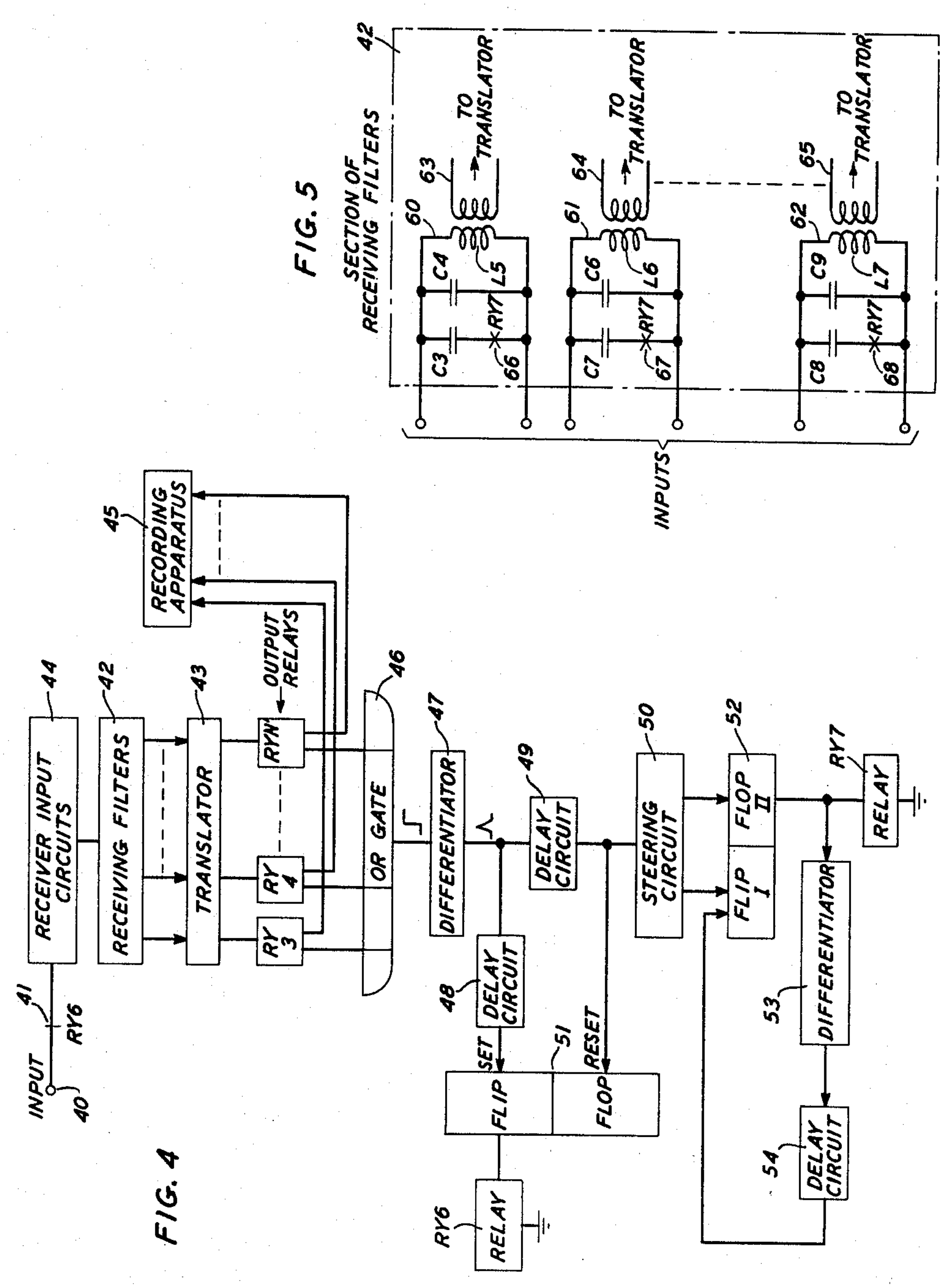
FIG. 4 is a block diagram of a receiver in accordance with the invention.
FIG. 5 is a schematic circuit diagram of a part of the receiving filters shown in block form in FIG. 4.

Illustrative terminal equipment required at the receiving end of a transmission system in accordance with the invention is shown in FIG. 4. The receiver includes two principal groups of equipment. The first group includes conventional receiver input circuits 44 and a bank of receiving filters 42, which may include a plurality of tuned circuits each resonant at a respective one of the transmission frequencies. In accordance with the coding scheme employed, outputs from each filter or combination of filters operates a corresponding one of the character relays RY3, RY4 . . . RYN' which is registered by recording apparatus 45, which may store the received signals by employing punched tape, for example, or by other suitable conventional means.

The second group of equipment in the receiver includes apparatus for shifting and synchronizing the receiver modes to correspond to the modes of the transmitted characters. In a broad sense this equipment is similar in operation to the mode control equipment of the transmitter.

The operation of any one of the output or character relays RY3, RY4 . . . RYN' results in the application of a step function to differentiator 47 by way of OR gate 46. With reference to FIG. 6, assume that an output from differentiator 47 occurs at time $t_0$. This output is then fed as a set input to flip-flop 51 by way of a delay circuit 48, the delay corresponding to the duration of the interval $t_0$–$t_1$. At time $t_1$ flip-flop 51, initially in the reset condition, shifts to the set condition and the accompanying output operates relay RY6. Break contact 41 of relay RY6 operates and the receiver is thereby made inoperative until the output pulse from differentiator 47 is applied by way of delay circuit 49 to reset flip-flop 51, removing the output to relay RY6. This action occurs at time $t_2$. Also at time $t_2$ the output from delay circuit 49 is applied by way of steering circuit 50 to shift flip-flop 52 from state I to state II. The structure and operation of steering circuit 50 is substantially identical to that shown in FIG. 2, described above. The change in the condition of flip-flop 52 effects the operation of mode shifting relay RY7.

Detached contacts of relay RY7 are shown in FIG. 5. The operation of each of the make contacts 66, 67 and 68 adds a respective one of the capacitors from the group C3, C5 . . . CN to each of the filters 60, 61 and 62 thereby enabling the filters to block mode I frequencies $f_0, f_1 \ldots f_n$ and pass mode II frequencies $f+\Delta, f_1+\Delta \ldots f_n+\Delta$. The operation of the receiver described thus far is repeated for successive characters as shown in FIG. 6.

The action of the receiver in assuming the rest mode I upon the termination of a group of characters having a terminal character in mode I is illustrated in FIG. 7. At time $t_4$ the shift to mode I from mode II is made in the manner previously described in anticipation of a succeeding character in mode I. The fact that the interval $t_3$–$t_9$ is in fact a prolonged intergroup space rather than a brief intercharacter space is of no consequence insofar as the mode shifting circuitry of the receiver is concerned. No signal is applied to initiate a mode shift and hence the rest mode, mode I, persists until time $t_{10}$.

The receiver's action in shifting to the rest mode after the conclusion of a group of characters in which the terminal character is transmitted in mode I is illustrated by the mode-time plot C of FIG. 8. At time $t_6$ the shift to mode II is effected in the manner previously described. Briefly, the shift of flip-flop 52 (FIG. 4) to state II causes an output signal to be applied to relay RY7. At the same time, the step function output of flip-flop 52 is differentiator 53 and the resulting output pulse is fed back to flip-flop 52 by way of delay circuit 54, thereby shifting flip-flop 52 back to state I. The removal of holding current from relay RY7 opens make contacts 66, 67, and 68 (FIG. 5) and at time $t_8$ the receiver is once again shifted to the rest mode, mode I, in anticipation of the receipt of a second group of characters such as CH5 and CH6. The duration of the delay introduced by delay circuit 54 (FIG. 4) is preselected in accordance with the duration of normal intergroup spacing. In FIG. 8 a delay period equal in duration to the interval $t_6$–$t_8$ is indicated.

The embodiment shown and described herein is illustrative of the principles of the invention. It is evident that a wide variety of modifications to this embodiment may be effected without departing from the spirit and scope of the invention.

What is claimed is:

1. In a pulse communication system, in combination, means for transmitting sequential, pulse-coded characters, alternate ones of said characters comprising at least one tone burst of a first frequency composition, intermediate ones of said characters comprising at least one tone burst of a second frequency composition, a receiver including means responsive after a preselected time delay to the termination of each of said alternate characters for rendering said receiver responsive only to said intermediate characters, means responsive after a preselected time delay to the termination of each of said intermediate characters for rendering said receiver responsive only to said alternate characters and means operative after the receipt of each of said characters for disabling said receiver for a period of time equal in duration to the time interval between successive ones of said characters, whereby said receiver is made insensitive to echoes of each of said alternate characters at all times except when said alternate characters are being received and insensitive to echoes of each of said intermediate characters at all times except when said intermediate characters are being received.

2. In a pulse communication system, in combination, means for transmitting sequential pulse groups each comprising at least one pulse, all of said pulses in each of said groups comprising at least one tone burst, the tone bursts in each of said groups having a frequency composition that differs from the frequency composition of said groups adjacent in time thereto, means for receiving said pulse groups including means responsive to the termination of the reception of each of said groups for disabling said receiving means for a first period of a first preselected duration, means operative upon the termination of said first period for rendering said receiving means responsive to the frequency composition of the next succeeding one of said groups, and means operative in the absence of any reception for a second period of a second preselected duration following the operation of said last named means for rendering said receiving means responsive to a preselected one of said frequency compositions.

3. In a pulse communication system, in combination, means for transmitting sequential pulse-coded characters each character being transmitted in one of a plurality of frequency modes, means responsive to the termination of the transmission of each of said characters for shifting said transmitter abruptly to a different one of said modes to accommodate the transmission of the next succeeding one of said characters, means responsive to the termination of the transmission of any one of said characters in a preselected one of said modes followed by the absence of any transmission for a period of a first preselected duration for shifting said transmitter back to said preselected mode, means for receiving said characters comprising means responsive to the termination of the reception of a character in any one of said modes for disabling said receiver abruptly for a period of a second preselected duration and for shifting said receiver to a different one of said modes upon termination of the period of said second preselected duration, and means responsive to the terminaiton of the reception of a character in said preselected mode followed by the absence of any received character for a period of a third preselected duration for shifting said receiver back to said preselected mode.

4. A pulse communication system comprising, in combination, means for transmitting sequential pulse groups in a preassigned sequence of frequency modes, each of said modes comprising a respective frequency composition, each of said pulses in each one of said groups being transmitted in a mode corresponding to said one group, a receiver operable in any one of a plurality of frequency bands each corresponding to a respective one of said modes, means responsive to the termination of the reception of any one of said pulse groups for disabling said receiver for a first preselected period, means operative upon the termination of said first period for shifting said receiver to the frequency band corresponding to the mode of the next succeeding pulse group in accordance with said preassigned sequence, and means responsive to the operation of said receiver shifting means followed by the absence of a pulse group in said last named mode for a second preselected period for shifting said receiver to the frequency band corresponding to a particular preselected one of said modes.

5. A communication system comprising, in combination, means for transmitting sequential groups of electrical signals, each group comprising signals within a preassigned frequency band in accordance with a preassigned sequence of frequency bands in which adjacent groups employ different ones of said bands, each of said groups being separated by a common delay period from adjacent ones of said groups, receiving means operable in each of said frequency bands, said receiving means comprising means responsive to the termination of each of said groups for disabling said receiving means for the duration of a respective one of said common delay periods, and means responsive to the termination of each of said groups and operable after each corresponding one of said delay periods for shifting said receiver to the frequency band of the next succeeding one of said groups in accordance with said preassigned sequence, whereby said receiving means is rendered insensitive to echoes of all of said groups during said common delay periods and insensitive to echoes in all but one of said frequency bands during the reception of each of said groups.

6. Apparatus in accordance with claim 5 including means responsive to the transmission of the terminal one of said groups for shifting said transmitting means to a preselected one of said frequency bands, and means responsive to the reception of the terminal one of said groups for shifting said receiving means to said preselected frequency band, whereby said transmitting means and said receiving means are synchronized for the transmission and reception, respectively, of an initial one of a succeeding sequence of said groups.

7. Apparatus for receiving a sequence of characters encoded in the form of tone pulses, alternate ones of said characters comprising at least one tone pulse of at least one frequency from a first group of frequencies and intermediate ones of said characters comprising at least one tone pulse of at least one frequency from a second group of frequencies, said apparatus comprising, in combination, a plurality of means each responsive to tone pulses including only frequencies from one of said groups for developing respective output signals, means responsive to each of said output signals for recording said signals, first means responsive to said output signals after a preselected time delay for rendering said output signal developing means responsive to tone pulses including only frequencies from the other of said groups, and means for disabling said receiving apparatus for a preselected period after the receipt of each of said characters.

8. Apparatus in accordance with claim 7 wherein said signal developing means includes a plurality of filters each designed to pass a respective one of said frequencies from one of said groups of frequencies.

9. Apparatus in accordance with claim 8 wherein said first means includes means for changing the reactance of each of said filters.

10. In a pulse communication system, in combination, means for transmitting sequential pulse coded characters, alternate ones of said characters comprising at least one tone pulse of a first frequency composition, intermediate ones of said characters comprising at least one tone pulse of a second frequency composition, a receiver including means responsive to the receipt of one of said pulses having one of said frequency compositions operative after a preassigned time delay having a duration not less than the period required for the reception of all of the pulses representing one of said characters for disabling said receiver for a period equal in duration to the time interval between successive ones of said characters, and means responsive to the receipt of said one of said pulses having said one of said frequency compositions operative upon the termination of said last named period for rendering said receiver insensitive to pulses of said last named frequency composition and sensitive to the pulses of the other one of said frequency compositions, said last named means being operative for a period of time equal in duration to said preassigned time delay.

References Cited by the Examiner

UNITED STATES PATENTS

| | | | |
|---|---|---|---|
| 2,676,203 | 4/54 | Phelps | 325—30 |
| 2,744,960 | 5/56 | Greefkes et al. | 179—15 |

FOREIGN PATENTS

| | | |
|---|---|---|
| 585,340 | 10/59 | Canada. |

DAVID G. REDINBAUGH, *Primary Examiner.*

L. MILLER ANDRUS, *Examiner.*